(12) United States Patent
Kaneda

(10) Patent No.: US 10,890,503 B2
(45) Date of Patent: Jan. 12, 2021

(54) POSITION SENSOR MALFUNCTION DETERMINATION APPARATUS

(71) Applicant: SUBARU CORPORATION, Tokyo (JP)

(72) Inventor: Tomoyuki Kaneda, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 91 days.

(21) Appl. No.: 16/397,669

(22) Filed: Apr. 29, 2019

(65) Prior Publication Data

US 2019/0368962 A1 Dec. 5, 2019

(30) Foreign Application Priority Data

May 29, 2018 (JP) .................................. 2018-102129

(51) Int. Cl.
*G01M 15/14* (2006.01)
*G01L 27/00* (2006.01)
(Continued)

(52) U.S. Cl.
CPC .......... *G01L 27/007* (2013.01); *F02B 37/186* (2013.01); *F02D 41/0007* (2013.01); *F02D 41/222* (2013.01); *F02M 26/48* (2016.02)

(58) Field of Classification Search
CPC .... F02B 37/183; F02B 37/186; F02D 41/222; G01L 27/007
(Continued)

(56) References Cited

U.S. PATENT DOCUMENTS

2005/0193977 A1 9/2005 Hata et al.
2015/0082788 A1* 3/2015 Wang .................... F02B 37/183
60/602
(Continued)

FOREIGN PATENT DOCUMENTS

EP      2 194 256 A2   6/2010
JP      2005-248800 A  9/2005
(Continued)

OTHER PUBLICATIONS

Japanese Office Action, dated Dec. 24, 2019, in Japanese Application No. 2018-102129 and English Translation thereof.

*Primary Examiner* — Eric S. McCall
(74) *Attorney, Agent, or Firm* — McGinn IP Law Group, PLLC

(57) ABSTRACT

A position sensor malfunction determination apparatus includes a determination unit and a controller. The determination unit is configured to perform a determination relating to electricity supply failure in a position sensor. The controller is configured to perform a fail-safe control. The determination unit is configured to determine whether each of conditions (A) and (B) is established, in a preliminarily determination before occurrence of the electricity supply failure in the position sensor is finally determined. The determination unit is configured to determine that the position sensor has a probability of the electricity supply failure when both the conditions (A) and (B) are determined to be established in the preliminarily determination. The controller is configured to execute, when the determination unit determines that the position sensor has the probability of the electricity supply failure, the fail-safe control before the occurrence of the electricity supply failure in the position sensor is finally determined.

7 Claims, 3 Drawing Sheets

(51) Int. Cl.
   *F02M 26/48*   (2016.01)
   *F02D 41/00*   (2006.01)
   *F02B 37/18*   (2006.01)
   *F02D 41/22*   (2006.01)

(58) Field of Classification Search
   USPC .......................................... 73/114.69, 114.77
   See application file for complete search history.

(56) References Cited

U.S. PATENT DOCUMENTS

| | | | |
|---|---|---|---|
| 2016/0178470 A1* | 6/2016 | Ge ..................... | G01M 15/106 |
| | | | 73/1.57 |
| 2017/0089286 A1* | 3/2017 | Deb ....................... | F02B 37/18 |
| 2017/0276065 A1 | 9/2017 | Sakata | |
| 2019/0170061 A1* | 6/2019 | Dudar ................... | F02B 37/186 |
| 2020/0240334 A1* | 7/2020 | Bastanipour .......... | F02B 37/186 |

FOREIGN PATENT DOCUMENTS

| | | | |
|---|---|---|---|
| JP | 2009-074375 A | 4/2009 |
| JP | 2010-133277 A | 6/2010 |
| JP | 2010-190063 A | 9/2010 |
| JP | 2015-178809 A | 10/2015 |
| JP | 2017-166443 A | 9/2017 |
| JP | 2017-172476 A | 9/2017 |

* cited by examiner

POSITION SENSOR MALFUNCTION DETERMINATION APPARATUS

CROSS-REFERENCE TO RELATED APPLICATIONS

The present application claims priority from Japanese Patent Application No. 2018-102129 filed on May 29, 2018, the entire contents of which are hereby incorporated by reference.

BACKGROUND

The technology relates to a position sensor malfunction determination apparatus that performs a determination relating to electricity supply failure in a position sensor that measures an opening position of a wastegate valve in a turbocharger of a vehicle.

A turbocharger is a supercharger that drives a turbine by using exhaust gas discharged from an engine of a vehicle, such as an automobile, and compresses combustion air or new air in the engine by using a compressor coupled to the turbine. The turbocharger is provided with components including a wastegate passage and a wastegate valve (WGV). The wastegate passage allows part of the exhaust gas to bypass the turbine from upstream side to downstream side. The wastegate valve opens and closes the wastegate passage.

A position sensor or a stroke sensor is used to measure an opening position of the wastegate valve. For example, Japanese Unexamined Patent Application Publication No. 2017-166443 discloses a method of determining and diagnosing electricity supply failure in such a position sensor.

SUMMARY

An aspect of the technology provides a position sensor malfunction determination apparatus that includes a determination unit and a controller. The determination unit is configured to perform a determination relating to electricity supply failure in a position sensor. The position sensor is configured to measure an opening position of a wastegate valve of a turbocharger. The turbocharger includes a turbine, a compressor, a wastegate passage, and the wastegate valve. The turbine is configured to be driven by exhaust gas that is discharged from an engine of a vehicle. The compressor is configured to be driven by the turbine to compress combustion air. The wastegate passage is configured to allow part of the exhaust gas to bypass the turbine from upstream side to downstream side. The wastegate valve is configured to be driven by an electric actuator to open and close the wastegate passage. The controller is configured to perform a fail-safe control. The fail-safe control stops supply of electricity to the electric actuator on the basis of a result of the determination performed by the determination unit. The determination unit is configured to determine whether each of the following conditions (A) and (B) is established, in a preliminarily determination before occurrence of the electricity supply failure in the position sensor is finally determined. The determination unit is configured to determine that the position sensor has a probability of the electricity supply failure when the determination unit determines that both of the conditions (A) and (B) are established in the preliminarily determination. The controller is configured to execute, when the determination unit determines that the position sensor has the probability of the electricity supply failure, the fail-safe control before the occurrence of the electricity supply failure in the position sensor is finally determined.

(A) An output position output from the position sensor is displaced at a velocity greater than a maximum velocity of the electric actuator.

(B) The output position output from the position sensor has a value near a range in which the position sensor is in one of a shorted state and a disconnected state.

An aspect of the technology provides a position sensor malfunction determination apparatus that includes circuitry. The circuitry is configured to perform a determination relating to electricity supply failure in a position sensor. The position sensor is configured to measure an opening position of a wastegate valve of a turbocharger. The turbocharger includes a turbine, a compressor, a wastegate passage, and the wastegate valve. The turbine is configured to be driven by exhaust gas that is discharged from an engine of a vehicle. The compressor is configured to be driven by the turbine to compress combustion air. The wastegate passage is configured to allow part of the exhaust gas to bypass the turbine from upstream side to downstream side. The wastegate valve is configured to be driven by an electric actuator to open and close the wastegate passage. The circuitry is configured to perform a fail-safe control. The fail-safe control stops supply of electricity to the electric actuator on the basis of a result of the determination. The circuitry is configured to determine whether each of the following conditions (A) and (B) is established, in a preliminarily determination before occurrence of the electricity supply failure in the position sensor is finally determined. The circuitry is configured to determine that the position sensor has a probability of the electricity supply failure when a determination is made that both of the conditions (A) and (B) are established in the preliminarily determination. The circuitry is configured to execute, when a determination is made that the position sensor has the probability of the electricity supply failure, the fail-safe control before the occurrence of the electricity supply failure in the position sensor is finally determined.

(A) An output position output from the position sensor is displaced at a velocity greater than a maximum velocity of the electric actuator.

(B) The output position output from the position sensor has a value near a range in which the position sensor is in one of a shorted state and a disconnected state.

DETAILED DESCRIPTION

Figure 1:
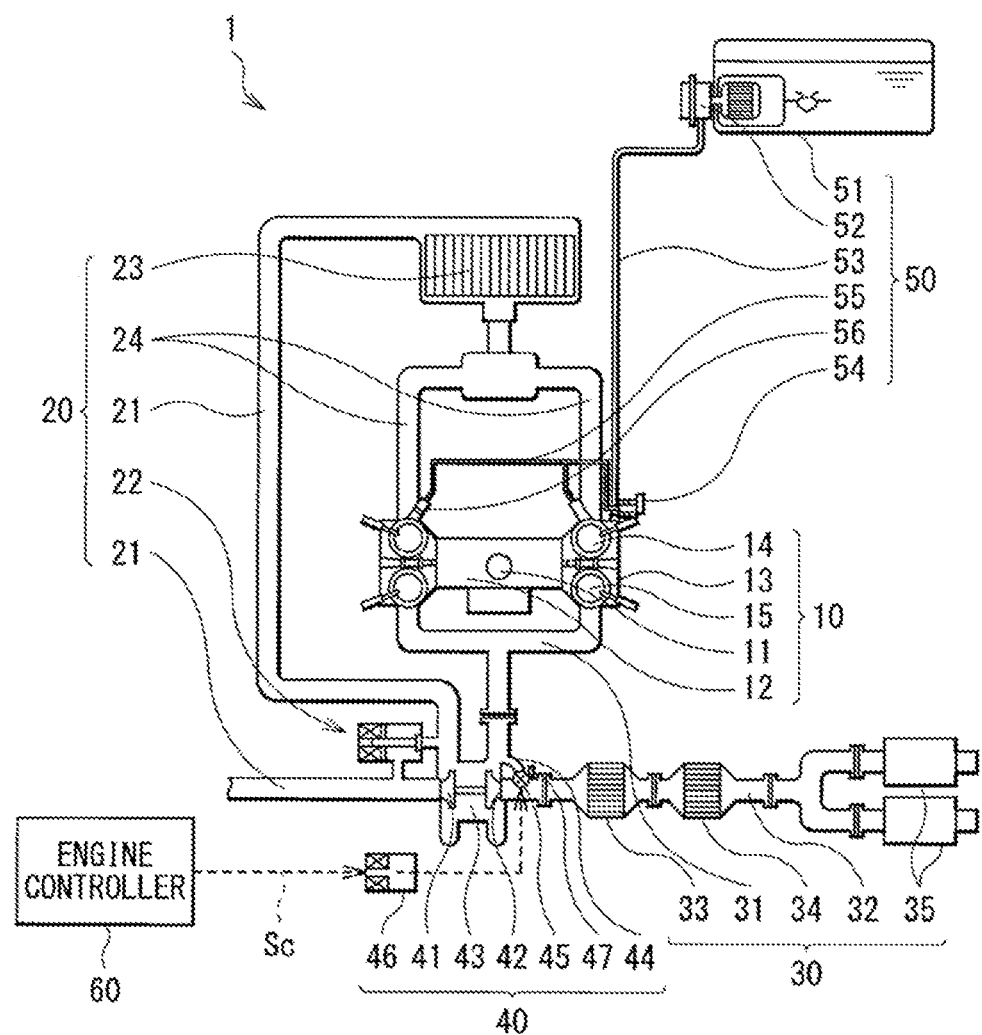
FIG. 1 is a schematic diagram illustrating an example of an approximate configuration of an engine provided with a position sensor malfunction determination apparatus according to one implementation of the technology.

In the following, a description is given of one example implementation of the technology with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a ratio between the elements, and relative positional relationship between the elements are illustrative only and not to be construed as limiting to the technology. Further, elements in the following example implementations which are not recited in a most-generic independent claim of the disclosure are optional and may be provided on an as-needed basis. Throughout the present specification and the drawings, elements substantially the same as or equivalent to each other are denoted with the same numerals to avoid any redundant description. The description is given in the following order.

1. Example Implementation (An example of a Malfunction Determination Method involving performing a fail-safe control on the basis of a preliminarily determination)
2. Modification Examples A determination of electricity supply failure in a position sensor can cause the following problem if a time required for an electricity supply diagnosis, that is, a diagnosis time, is longer than a transition time from a fully-closed state to a fully-opened state of the wastegate valve or a transition time from the fully-opened state to the fully-closed state of the wastegate valve. That is, the wastegate valve may move beyond a specified region before malfunction of the position sensor is finally determined on the basis of the electricity supply diagnosis, whereby an actuator that drives the wastegate valve, such as an electric actuator, may be damaged.

It is desirable to provide a position sensor malfunction determination apparatus that prevents a damage to an actuator due to malfunction of a position sensor.

1. Example Implementation

[Outline Configuration of Engine 1]

Figure 2:
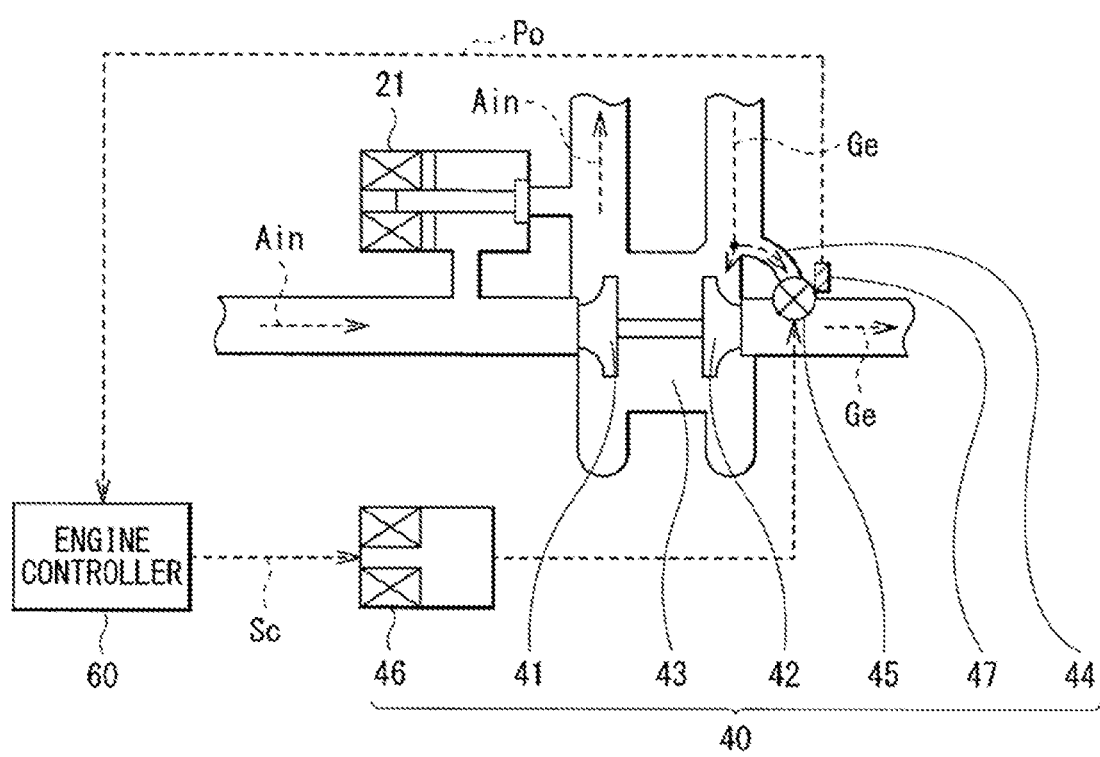
FIG. 2 is an enlarged schematic diagram illustrating an example of a configuration in the vicinity of a turbocharger illustrated in FIG. 1.

FIG. 1 schematically illustrates an example of an outline configuration of an engine 1 provided with a position sensor malfunction determination apparatus according to one example implementation of the technology. In one implementation, an engine controller 60 which will be described later may serve as a "position sensor malfunction determination apparatus". FIG. 2 schematically illustrates an example of a configuration in the vicinity of a turbocharger 40 in the engine 1 in an enlarged manner. The turbocharger 40 will be described later.

The engine 1 may be equipped on a vehicle, such as an automobile, and may generate power of the vehicle. The engine 1 may include an internal combustion engine of any type. In the example illustrated in FIG. 1, the engine 1 may be a turbocharged gasoline engine. FIG. 1 selectively illustrates a configuration of a main part of a configuration of the engine 1.

The engine 1 may include a main part 10, an intake device 20, an exhaust device 30, a turbocharger 40, a fuel supply device 50, and an engine controller 60, as illustrated in FIG. 1.

[Main Part 10]

The main part 10 may be a main machinery part of the engine 1 and may be a horizontally-opposed four-cylinder four-stroke double overhead camshaft (DOHC) gasoline direct-injection engine in this example. The main part 10 may include a crank shaft 11, a cylinder block 12, a cylinder head 13, an intake valve driving system 14, and an exhaust valve driving system 15, as illustrated in FIG. 1.

The crank shaft 11 may be an output shaft of the engine 1 and may be coupled to an unillustrated piston of each cylinder via a connecting rod. The cylinder block 12 may be a block-shaped member having each cylinder and may be divided into two parts, i.e., a left half part and a right half part, with the crank shaft 11 in between. The right half part of the cylinder block 12 may be provided with first and third cylinders. The left half part of the cylinder block 12 may be provided with second and fourth cylinders. The cylinder head 13 may be provided to left and right end parts of the cylinder block 12. The cylinder head 13 may include, for example but not limited to, a combustion chamber, an intake port, an exhaust port, an intake valve, and an exhaust valve, which are not illustrated in the drawings. The intake valve driving system 14 may drive the intake valve. The exhaust valve driving system 15 may drive the exhaust valve.

[Intake Device 20]

The intake device 20 may take in outside air and introduce this air to the intake port of the cylinder head 13 as combustion air Ain (refer to FIG. 2). The intake device 20 may include an intake duct 21, an air bypass valve 22, an intercooler 23, and an intake manifold 24, as illustrated in FIG. 1.

The intake duct 21 may be a conduit through which the combustion air Ain, which is taken in from outside, passes. The intake duct 21 may be provided with a compressor 41 of the turbocharger 40 at an intermediate part, as illustrated in FIGS. 1 and 2. The compressor 41 will be described later. The air bypass valve 22 (refer to FIG. 1) may open and close a bypass passage that allows the combustion air Ain, which flows in the intake duct 21, to bypass the compressor 41 from upstream side to downstream side. The intercooler 23 may cool the combustion air Ain, which is compressed by the compressor 41 as described later, by heat exchange with a travel wind. The travel wind is an air flow that is generated against a vehicle body as a result of traveling of the vehicle. The intake manifold 24 may be a branch pipe that distributes the combustion air Ain, which is output from a throttle valve, to an intake port of each of the cylinders. The throttle valve may adjust an amount of intake air.

[Exhaust Device 30]

The exhaust device 30 may exhaust burned gas, that is, exhaust gas Ge, from the exhaust port of the cylinder head 13. The exhaust device 30 may include an exhaust manifold 31, an exhaust pipe 32, a front catalyst 33, a rear catalyst 34, and a muffler 35, as illustrated in FIG. 1.

The exhaust manifold 31 may be an exhaust gas passage or an exhaust gas conduit that collects the exhaust gas Ge (refer to FIG. 2), which is output from the exhaust port of each of the cylinders, and that conducts the collected gas to a turbine 42 of the turbocharger 40. The turbine 42 will be described later. The exhaust pipe 32 may be an exhaust gas passage or an exhaust gas conduit that discharges the exhaust gas Ge, which is output from the turbine 42 of the turbocharger 40, to the outside. The turbine 42 will be described later. The front catalyst 33 and the rear catalyst 34 may be provided in the middle of the exhaust pipe 32 in this order from the turbine 42 side, as illustrated in FIG. 1. Each of the front catalyst 33 and the rear catalyst 34 may be, for example, a three-way catalyst that performs a process of reducing amounts of hydrocarbon (HC), carbon monoxide (CO), and nitrogen oxide (NOx) contained in the exhaust gas Ge. The muffler 35 may be disposed adjacent to an outlet of the exhaust pipe 32 and may decrease acoustic energy of the exhaust gas Ge to suppress exhaust noise.

[Turbocharger 40]

The turbocharger 40 may be an exhaust turbine supercharger (refer to FIG. 2) that compresses new air or the combustion air Ain by using energy of the exhaust gas Ge. The turbocharger 40 may include the compressor 41, the turbine 42, a bearing housing 43, a wastegate passage 44, a wastegate valve 45, an electric actuator 46, and a position sensor 47, as illustrated in FIGS. 1 and 2. The position sensor 47 may be a stroke sensor.

The compressor 41 may be a centrifugal compressor that is driven by the turbine 42 to compress the combustion air Ain. The turbine 42 (refer to FIG. 2) may be driven by the exhaust gas Ge to drive the compressor 41 by using the energy of the exhaust gas Ge. The bearing housing 43 may be provided between the compressor 41 and the turbine 42.

The wastegate passage 44 may be a bypass passage that allows part of the exhaust gas Ge to bypass the turbine 42 from upstream side to downstream side, as illustrated in FIGS. 1 and 2. The wastegate valve 45 may open and close the wastegate passage 44 in accordance with the driving performed by the electric actuator 46, as indicated by dashed line arrows in FIGS. 1 and 2. The electric actuator 46 may drive the wastegate valve 45 on the basis of a control signal Sc supplied from the engine controller 60, as indicated by the dashed line arrows in FIGS. 1 and 2. The engine controller 60 will be described later.

The position sensor 47 may be a sensor that measures an opening position or a stroke position of the wastegate valve 45, as indicated by the dashed line in FIG. 2. The opening position that is thus measured by the position sensor 47 may be output from the position sensor 47 as an output position Po and be supplied to the engine controller 60, as indicated by the dashed line arrow in FIG. 2.

[Fuel Supply Device 50]

The fuel supply device 50 may supply fuel, such as gasoline, to each of the cylinders of the engine 1. The fuel supply device 50 may include a fuel tank 51, a feed pump 52, a feed line 53, a high-pressure pump 54, a high-pressure fuel line 55, and an injector 56, as illustrated in FIG. 1.

The fuel tank 51 may be a container that stores the fuel. The feed pump 52 may discharge the fuel in the fuel tank 51 and send the fuel to the high-pressure pump 54. The feed line 53 may be a fuel passage through which the fuel that is discharged by the feed pump 52 is sent to the high-pressure pump 54. The high-pressure pump 54 may be attached to the cylinder head 13. The high-pressure pump 54 may be driven via a cam shaft to increase pressure of the fuel. The high-pressure fuel line 55 may be a fuel passage through which the fuel that is increased in pressure by the high-pressure pump 54, that is, a high-pressure fuel, is sent to the injector 56 provided to each of the cylinders. The injector 56 may be an injection valve that directly injects the high-pressure fuel, which is supplied from the high-pressure fuel line 55, into the combustion chamber of each of the cylinders in accordance with an injection signal supplied from the engine controller 60.

[Engine Controller 60]

The engine controller 60 may perform various kinds of operation control such as fuel injection control, ignition control, or intake air amount adjustment control, of the engine 1. Although details will be described later, the engine controller 60 may perform determination relating to electricity supply failure in the above-described position sensor 47 and may perform a predetermined fail-safe control (F/S control) on the basis of the result of the determination relating to the electricity supply failure. The predetermined fail-safe control may be performed by using the control signal Sc that is output from the engine controller 60 to stop supplying electricity to the electric actuator 46, that is, to cut electricity supply to the electric actuator 46 (refer to FIGS. 1 and 2).

The engine controller 60 may include, for example but not limited to, a microcomputer having a central processing unit (CPU), and a read-only memory (ROM), a random-access memory (RAM).

In one implementation, the engine controller 60 may serve as a "position sensor malfunction determination apparatus", a "determination unit", and a "controller".

Example Operation, Example Working, and Example Effects

Next, example operation, example working, and example effects of the engine 1 of one example implementation of the technology are described.

A. Electricity Supply Failure in Position Sensor 47

First, electricity supply failure, i.e., abnormality in an electricity supply system, in the position sensor 47 of the turbocharger 40 described above is described.

A typical method as a comparative example may perform a predetermined electricity supply diagnosis to finally determine occurrence of electricity supply failure in the position sensor 47. In this method as the comparative example, supply of electricity to the electric actuator 46 may be stopped after the electricity supply failure in the position sensor 47 is finally determined. The time required for the electricity supply diagnosis, in short, the diagnosis time, may be approximately 500 [ms] from the occurrence of electricity supply failure.

In contrast, the transition time between the fully-closed state and the fully-opened state or the transition time between a fully-closed position and a fully-opened position in the wastegate valve 45 may be shorter than the diagnosis time required for the electricity supply diagnosis described above. For example, the transition time from the fully-closed state to the fully-opened state may be approximately 320 [ms], and the transition time from the fully-opened state to the fully-closed state may be approximately 450 [ms]. Therefore, in the method as the comparative example, the wastegate valve 45 may move beyond a specified region and come into contact with a mechanical hard stop or an abutting part on open side or closed side before malfunction of the position sensor 47 is finally determined by the electricity supply diagnosis, whereby the electric actuator 46 can be damaged.

This phenomenon can occur in a case where electricity supply failure occurs in the position sensor 47 itself and can also occur, for example, in a case where malfunction, such as disconnection, occurs in wiring or a harness that couples the engine controller 60 to the position sensor 47. In such a case, although the turbocharger 40 itself is normal, and malfunction occurs only in the harness, the electric actuator 46 can be damaged.

The method as the comparative example is a malfunction determination method using only the electricity supply diagnosis. Therefore, malfunction of or damage to the electric actuator 46 may accompany the electricity supply failure in the position sensor 47 or in a relevant component. In such a case, additional part replacement, that is, part replacement of the electric actuator 46 should be performed in addition to part replacement of the position sensor 47 and the relevant component, thereby increasing cost for part exchange.

B. Malfunction Determination Method of One Example Implementation of Technology In view of this, in one example implementation of the technology, malfunction in the position sensor 47 may be determined by the engine controller 60 by using the method that is described in detail below.

Figure 3:
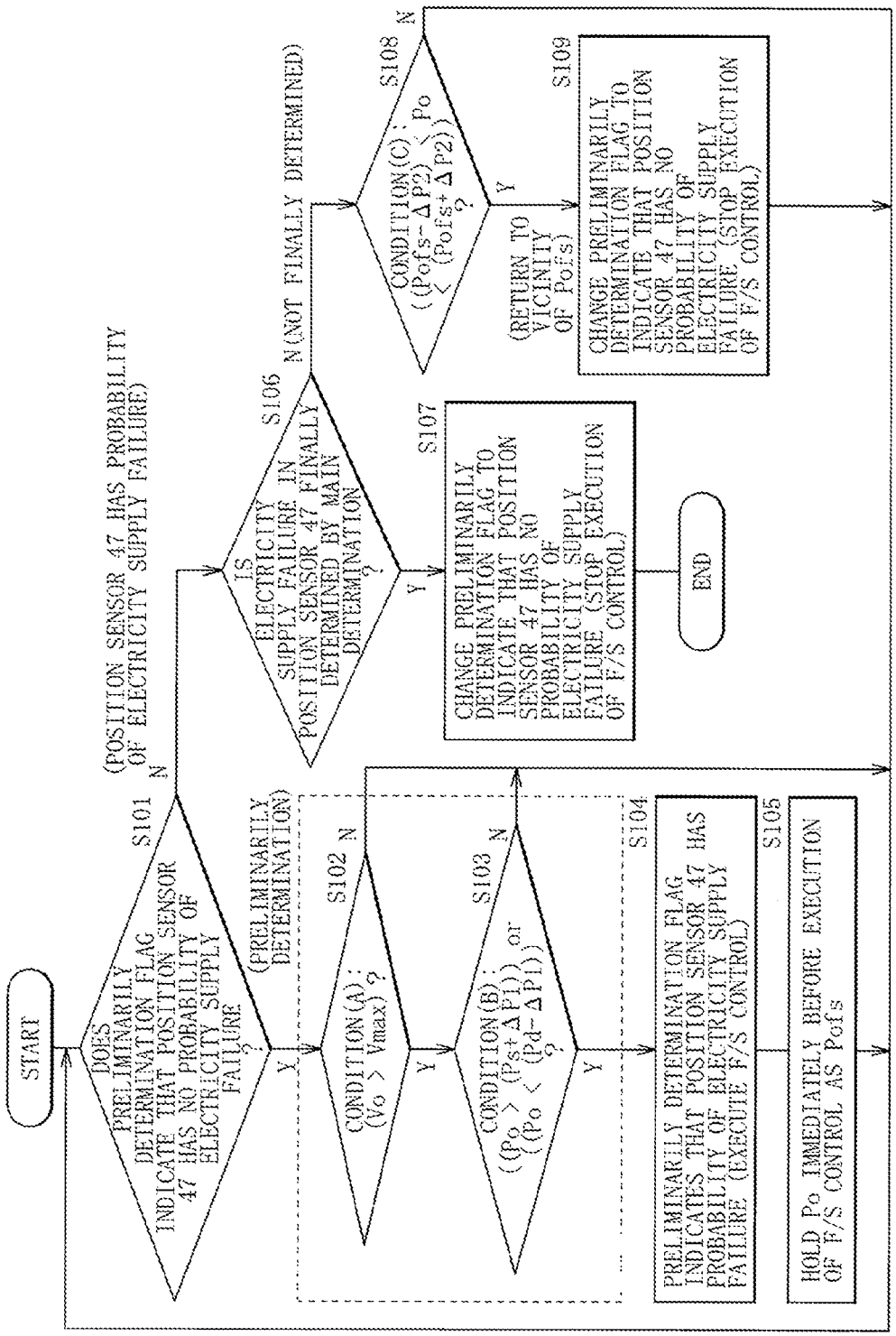
FIG. 3 is a flowchart illustrating an example of a position sensor malfunction determination method according to one implementation.

The following describes details of an example of a malfunction determination method for the position sensor 47 according to one example implementation of the technology, with reference to FIGS. 1, 2, and 3. FIG. 3 is a flowchart illustrating an example of the malfunction determination method for the position sensor 47 according to one example implementation of the technology.

[B-1. Start of Execution of F/S Control Using Preliminarily Determination]

In this malfunction determination method, first, the engine controller 60 may determine whether a preliminarily determination flag indicates that the position sensor 47 has no probability of malfunction in electricity supply (step S101 in FIG. 3). The preliminarily determination flag may indicate a result of a preliminarily determination. The preliminarily determination will be described later.

The preliminarily determination may be a determination preliminarily performed before occurrence of electricity supply failure in the position sensor 47 is finally determined by the electricity supply diagnosis described above. The electricity supply diagnosis may be a main determination, which will be described later. For example, in the example in FIG. 3, determinations in steps S102 and S103, which will be described later, may correspond to the preliminarily determination (refer to the part surrounded by the dashed line in FIG. 3). In step S102, whether a condition (A) is established may be determined. In step S103, whether a condition (B) is established may be determined. The conditions (A) and (B) will be described later.

When the preliminarily determination flag described above indicates that the position sensor 47 has a probability of malfunction (step S101: N), the procedure may advance to step S106, which will be described later.

Otherwise, when the preliminarily determination flag indicates that the position sensor 47 has no probability of malfunction (step S101: Y), the engine controller 60 may thereafter determine whether the following condition (A) is established, as a first preliminarily determination (step S102). For example, the engine controller 60 may determine whether an output position velocity Vo is greater in value than a maximum velocity Vmax (Vo>Vmax). The output position velocity Vo may be a displacement velocity at an output position Po. The output position Po and the maximum velocity Vmax will be described below.

Condition (A): The output position Po indicating the opening position, output from the position sensor 47, is displaced at a velocity greater than the maximum velocity Vmax of the electric actuator 46.

When it is determined that the condition (A) is not established, that is, Vo≤Vmax (step S102: N), the preliminarily determination flag described above may continuously indicate that the position sensor 47 has no probability of malfunction, and the procedure may return to step S101 described above.

Otherwise, when it is determined that the condition (A) is established, that is, Vo>Vmax (step S102: Y), the engine controller 60 may thereafter determine whether the following condition (B) is established, as a second preliminarily determination (step S103). For example, the engine controller 60 may determine whether one of two conditional expressions: Po>(Ps+ΔP1) and Po<(Pd−ΔP1), is established. In these conditional expressions, "Ps" represents a position at which the position sensor 47 is shorted, "Pd" represents a position at which the position sensor 47 is disconnected, and "ΔP1" represents a predetermined amount of margin.

Condition (B): The output position Po output from the position sensor 47 has a value near a range in which the position sensor 47 is in one of a shorted state and a disconnected state.

When it is determined that the condition (B) is not established, that is, both of the two conditional expressions are not established (step S103: N), the above-described preliminarily determination flag may continuously indicate that the position sensor 47 has no probability of malfunction, and the procedure may return to step S101 described above.

In contrast, it may be determined that the condition (B) is established, that is, one of the two conditional expressions is established (step S103: Y). This decision may represent that both of the conditions (A) and (B) are established in the preliminarily determination. Accordingly, in this case, it may be determined that the position sensor 47 has the probability of electricity supply failure. Therefore, the engine controller 60 may thereafter change the preliminarily determination flag described above to cause the preliminarily determination flag to indicate that the position sensor 47 has the probability of malfunction. In the case where it is determined that the position sensor 47 has the probability of electricity supply failure, the engine controller 60 may execute the predetermined fail-safe control (F/S control) described above before the electricity supply failure in the position sensor 47 is finally determined by using the above-described electricity supply diagnosis. That is, the engine controller 60 may perform a control by using the control signal Sc to stop supply of electricity to the electric actuator 46 (step S104).

Thereafter, the engine controller 60 may hold or store the output position Po output from the position sensor 47, which is obtained immediately before the F/S control is executed, as an immediately-before output position Pofs (step S105). The procedure may thereafter return to the step S101 described above and may advance to step S106 and subsequent steps because the preliminarily determination flag indicates that the position sensor 47 has the probability of malfunction.

[B-2. Termination of Execution of F/S Control after Preliminarily Determination]

The following describes the procedure in the case where the preliminarily determination flag indicates that the position sensor 47 has the probability of malfunction in step S101 (step S101: N), that is, the processes in step S106 and in subsequent steps, which are performed after the F/S control described above is executed.

In this case, first, the engine controller 60 may determine whether electricity supply failure in the position sensor 47 is finally determined, by using the above-described electricity supply diagnosis (step S106). The electricity supply diagnosis may be the main determination that is performed after the preliminarily determination is performed.

When it is finally determined that electricity supply failure occurs in the position sensor 47 (step S106: Y), the following step is performed. That is, the engine controller 60 may change the above-described preliminarily determination flag to cause the preliminarily determination flag to indicate that the position sensor 47 has no probability of malfunction and may stop execution of the F/S control (step S107). Thus, in the case where electricity supply failure in the position sensor 47 is finally determined, the above-described preliminarily determination, i.e., the determinations of the conditions (A) and (B), may not be started again, and the series of the processes performed by the engine controller 60 illustrated in FIG. 3 may be terminated.

In contrast, when it is not finally determined that electricity supply failure occurs in the position sensor 47 (step S106: N), the following step is performed. That is, the engine controller 60 may thereafter determine whether a predetermined condition relating to the probability of electricity supply failure in the position sensor 47 is established. For example, the engine controller 60 may determine whether the predetermined condition, that is, the following condition (C) is established (step S108). In more detail, the engine controller 60 may determine whether a conditional expression: (Pofs−ΔP2)<Po<(Pofs+ΔP2), is established. In this conditional expression, "ΔP2" represents a predetermined amount of overshoot.

Condition (C): the output position Po output from the position sensor 47 returns to the vicinity of the immediately-before output position Pofs that is held in step S105.

In one implementation, the condition (C) may serve as a "predetermined condition".

When it is determined that the predetermined condition described above, i.e., the condition (C) is not established (step S108: N), the following procedure may be performed. This determination may represent that the output position Po does not return to the vicinity of the immediately-before output position Pofs and the position sensor 47 still has the probability of electricity supply failure. That is, in this case, the procedure may return to the step S101 described above. Thereafter, the procedure may return again to step S106 and the subsequent steps described above because the above-described preliminarily determination flag indicates that the position sensor 47 has the probability of malfunction.

In contrast, when it is determined that the predetermined condition, i.e., the condition (C), is established (step S108: Y), the following procedure may be performed. This determination may represent that the output position Po returns to the vicinity of the immediately-before output position Pofs, and the position sensor 47 does not have the probability of electricity supply failure anymore. That is, the engine controller 60 may change the above-described preliminarily determination flag to cause the preliminarily determination flag to indicate that the position sensor 47 has no probability of malfunction and may stop execution of the F/S control (step S109). Thereafter, the procedure may return to the above-described step S101 and may start again the above-described preliminarily determination, that is, the determinations of the conditions (A) and (B) in steps S102 and S103, because the preliminarily determination flag indicates that the position sensor 47 has no probability of malfunction. The above describes the series of the processes performed by the engine controller 60 illustrated in FIG. 3.

C. Example Working and Example Effects

In one example implementation of the technology, the engine controller 60 may perform a determination of electricity supply failure in the position sensor 47 as described below. That is, first, the engine controller 60 may determine that the position sensor 47 has the probability of electricity supply failure in the case where it is decided that both of the above-described conditions (A) and (B) are established in the preliminarily determination before occurrence of electricity supply failure in the position sensor 47 is finally determined (refer to steps S102 to S104 in FIG. 3). Thereafter, in the case where it is thus determined that the position sensor 47 has the probability of electricity supply failure, the engine controller 60 may execute the fail-safe control (F/S control) to stop supply of electricity to the electric actuator 46 before occurrence of electricity supply failure in the position sensor 47 is finally determined (refer to the description in parentheses in step S104 in FIG. 3).

Therefore, one example implementation of the technology is different from the above-described malfunction determination method of the comparative example in that supply of electricity to the electric actuator 46 is stopped in an earlier stage before electricity supply failure in the position sensor 47 is finally determined. Unlike the comparative example, in one example implementation of the technology, the possibility is decreased that the electric actuator 46 is also damaged in accordance with the probability of the electricity supply failure in the position sensor 47. That is, the F/S control that is performed when electricity supply failure occurs in the position sensor 47 may be executed without depending only on the electricity supply diagnosis serving as the main determination. Therefore, the control may be shifted to the F/S control before the electric actuator 46 is damaged, for example but not limited to, in the case where electricity supply failure occurs in the position sensor 47 itself or in the case where malfunction such as disconnection of a harness as described above occurs.

From this point of view, in one example implementation of the technology, it is also possible to improve reliability of operation, e.g., open-close operation, of the wastegate valve 45. Accordingly, in one example implementation of the technology, additional part replacement, that is, part replacement of the electric actuator 46 that is performed in addition to part replacement of the position sensor 47 and a relevant component, is prevented, unlike the above-described comparative example. Therefore, one example implementation of the technology also decreases cost for part replacement in a case where malfunction occurs in the position sensor 47 and in the relevant component, compared with the comparative example.

The engine controller 60 may also determine whether the predetermined condition relating to the probability of electricity supply failure, that is, the above-described condition (C), is established, after the F/S control described above is executed (refer to step S108 in FIG. 3). In the case where the predetermined condition is established and it is determined that the position sensor 47 does not have the probability of electricity supply failure anymore, the engine controller 60 may stop execution of the F/S control and start again the preliminarily determination, that is, the determinations of the conditions (A) and (B) (refer to step S109, and steps S101 to S103 in FIG. 3). In one example implementation of the technology, this enables further determination as to whether the position sensor 47 has the probability of electricity supply failure, that is, whether the state returns to a state with no probability of electricity supply failure, before occurrence of electricity supply failure is finally determined, even after the probability of electricity supply failure in the position sensor 47 is once determined in the preliminarily determination. Therefore, in a case where the state returns to a state with no probability of electricity supply failure, further execution of the F/S control may be stopped before occurrence of electricity supply failure is finally determined, thereby improving convenience of the malfunction determination.

Moreover, the engine controller 60 may hold the output position Po, which is output from the position sensor 47 immediately before the F/S control is executed, as the immediately-before output position Pofs (refer to step S105 in FIG. 3). The engine controller 60 may determine whether the output position Po output from the position sensor 47 returns to the vicinity of the immediately-before output position Pofs to determine whether the above-described predetermined condition is established, before occurrence of electricity supply failure in the position sensor 47 is finally determined (refer to step S108 in FIG. 3). In one example implementation of the technology, this enables easier determination as to whether the position sensor 47 has the above-described probability described above, that is, easier determination as to whether the state returns to the state with no probability, thereby further improving convenience of the malfunction determination.

Furthermore, in the case where occurrence of electricity supply failure in the position sensor 47 is finally determined after the F/S control is executed, the preliminarily determination, that is, the determinations of the conditions (A) and (B), may not be started again, and the series of the processes performed by the engine controller 60, as illustrated in FIG. 3, may be terminated (refer to steps S106 and S107, and "END" in FIG. 3). Therefore, in one example implementation of the technology, after occurrence of electricity supply failure is finally determined by the above-described electricity supply diagnosis serving as the main determination, the preliminarily determination may not be performed further. This also improves convenience of the malfunction determination.

2. Modification Examples

Although an example implementation of the technology has been described in the foregoing, the technology is by no means limited to the example implementation described above and is variously modifiable.

For example, structural factors such as type, shape, arrangement, and number of pieces, of each of the components of the engine 1 are not limited to those described in the foregoing example implementation. That is, each of the components, for example, the main part 10, the intake device 20, the exhaust device 30, the turbocharger 40, the fuel supply device 50, and the engine controller 60, may be another type, have another shape, or be disposed at a different position, or the number of each of the components may be different from that described above. In addition, the values, the ranges, the magnitude relationship, and other factors, of the various parameters are not limited to those described in the foregoing implementation and may differ therefrom.

For example, although an example using a horizontally-opposed four-cylinder gasoline engine as the engine 1 is described in the foregoing example implementation, the layout and the number of the cylinders, an ignition order, and other factors, are not limited to those described in the forgoing example implementation. The technology is not limited to the case of using the gasoline engine described in the foregoing example implementation. For example, it is also possible to apply one implementation of the technology in cases of using a turbocharged diesel engine and other internal combustion engines.

Although an example of the method of determining malfunction in the position sensor 47 is described in the foregoing example implementation, the method of the malfunction determination is not limited thereto, and any other method may be used.

The series of the processes described in the foregoing example implementation may be performed by hardware or circuitry, by software, or by using a program. In a case of performing the series of the processes by software, the software may include a program group that allows a computer to execute each operation. For example, each program may be used by being preliminarily provided in the computer or may be used by being installed in the computer from a network or a storage medium.

In addition, various examples described above may be applied in any combination.

The effects described in this specification are merely examples. The effects are not limited thereto and any other effect may be provided.

The engine controller 60 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the engine controller 60 illustrated in FIG. 1. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the engine controller 60 illustrated in FIG. 1.

Although an implementation of the technology has been described in the foregoing by way of example with reference to the accompanying drawings, the technology is by no means limited to the implementations described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A position sensor malfunction determination apparatus comprising:
   a determination unit configured to perform a determination relating to electricity supply failure in a position sensor, the position sensor being configured to measure an opening position of a wastegate valve of a turbocharger, the turbocharger including a turbine, a compressor, a wastegate passage, and the wastegate valve, the turbine being configured to be driven by exhaust gas that is discharged from an engine of a vehicle, the compressor being configured to be driven by the turbine to compress combustion air, the wastegate passage being configured to allow part of the exhaust gas to bypass the turbine from upstream side to downstream side, the wastegate valve being configured to be driven by an electric actuator to open and close the wastegate passage; and
   a controller configured to perform a fail-safe control, the fail-safe control stopping supply of electricity to the electric actuator on a basis of a result of the determination performed by the determination unit,
   the determination unit being configured to determine whether each of the following conditions (A) and (B) is established, in a preliminarily determination before occurrence of the electricity supply failure in the position sensor is finally determined, the determination unit being configured to determine that the position sensor has a probability of the electricity supply failure when the determination unit determines that both of the conditions (A) and (B) are established in the preliminarily determination, the controller being configured to execute, when the determination unit determines that the position sensor has the probability of the electricity supply failure, the fail-safe control before the occurrence of the electricity supply failure in the position sensor is finally determined, (A) an output position output from the position sensor is displaced at a velocity greater than a maximum velocity of the electric actuator, (B) the output position output from the position sensor has a value near a range in which the position sensor is in one of a shorted state and a disconnected state.

2. The position sensor malfunction determination apparatus according to claim 1, wherein, when the determination unit finally determines, after the fail-safe control is executed, the occurrence of the electricity supply failure in the position sensor, the determination unit does not start the preliminarily determination anymore, and the determination unit and the controller terminate performing respective processes.

3. The position sensor malfunction determination apparatus according to claim 1, wherein the determination unit further determines whether a predetermined condition relating to the probability of the electricity supply failure is established, after the fail-safe control is executed, and, when the determination unit determines that the predetermined condition is established and the position sensor does not have the probability of the electricity supply failure anymore, the controller stops execution of the fail-safe control, and the determination unit starts the preliminarily determination again.

4. The position sensor malfunction determination apparatus according to claim 3, wherein, when the determination unit finally determines, after the fail-safe control is executed, the occurrence of the electricity supply failure in the position sensor, the determination unit does not start the preliminarily determination anymore, and the determination unit and the controller terminate performing respective processes.

5. The position sensor malfunction determination apparatus according to claim 3, wherein the controller holds, as an immediately-before output position, the output position output from the position sensor immediately before the fail-safe control is executed, and the determination unit determines, before the occurrence of the electricity supply failure in the position sensor is finally determined, whether the output position output from the position sensor returns to vicinity of the immediately-before output position to determine whether the predetermined condition is established.

6. The position sensor malfunction determination apparatus according to claim 5, wherein, when the determination unit finally determines, after the fail-safe control is executed, the occurrence of the electricity supply failure in the position sensor, the determination unit does not start the preliminarily determination anymore, and the determination unit and the controller terminate performing respective processes.

7. A position sensor malfunction determination apparatus comprising circuitry configured to perform a determination relating to electricity supply failure in a position sensor, the position sensor being configured to measure an opening position of a wastegate valve of a turbocharger, the turbocharger including a turbine, a compressor, a wastegate passage, and the wastegate valve, the turbine being configured to be driven by exhaust gas that is discharged from an engine of a vehicle, the compressor being configured to be driven by the turbine to compress combustion air, the wastegate passage being configured to allow part of the exhaust gas to bypass the turbine from upstream side to downstream side, the wastegate valve being configured to be driven by an electric actuator to open and close the wastegate passage, perform a fail-safe control, the fail-safe control stopping supply of electricity to the electric actuator on a basis of a result of the determination, determine whether each of the following conditions (A) and (B) is established, in a preliminarily determination before occurrence of the electricity supply failure in the position sensor is finally determined, determine that the position sensor has a probability of the electricity supply failure when a determination is made that both of the conditions (A) and (B) are established in the preliminarily determination, and execute, when a determination is made that the position sensor has the probability of the electricity supply failure, the fail-safe control before the occurrence of the electricity supply failure in the position sensor is finally determined, (A) an output position output from the position sensor is displaced at a velocity greater than a maximum velocity of the electric actuator, (B) the output position output from the position sensor has a value near a range in which the position sensor is in one of a shorted state and a disconnected state.

* * * * *